(12) United States Patent
Nola

(10) Patent No.: US 10,336,248 B2
(45) Date of Patent: Jul. 2, 2019

(54) ENGINE COVER HAVING EMBEDDED CIRCUIT FOR ILLUMINATED BADGING

(71) Applicant: Ford Global Technologies, LLC, Dearborn, MI (US)

(72) Inventor: Gary Nola, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 15/615,312

(22) Filed: Jun. 6, 2017

(65) Prior Publication Data

US 2018/0345858 A1    Dec. 6, 2018

(51) Int. Cl.
| | |
|---|---|
| *H01T 13/18* | (2006.01) |
| *H01T 13/06* | (2006.01) |
| *B60Q 3/80* | (2017.01) |
| *B60Q 3/30* | (2017.01) |
| *B60Q 3/59* | (2017.01) |
| *F21Y 115/10* | (2016.01) |

(52) U.S. Cl.
CPC ............... *B60Q 3/80* (2017.02); *B60Q 3/30* (2017.02); *B60Q 3/59* (2017.02); *F21Y 2115/10* (2016.08)

(58) Field of Classification Search
CPC .... B60Q 3/80; B60Q 3/30; B60Q 3/59; F21Y 2115/10
See application file for complete search history.

(56) References Cited

U.S. PATENT DOCUMENTS

| | | | |
|---|---|---|---|
| 4,904,429 A | 2/1990 | Takahashi et al. | |
| 6,186,106 B1 | 2/2001 | Glovatsky et al. | |
| 2003/0209889 A1* | 11/2003 | Erwin ............... | B60R 21/21656 280/728.3 |
| 2005/0039024 A1* | 2/2005 | Stemm ................ | B62D 25/12 713/182 |
| 2013/0335997 A1* | 12/2013 | Roberts ................ | G09F 21/04 362/583 |
| 2014/0305140 A1* | 10/2014 | Hasegawa ............. | F02B 77/13 62/3.2 |
| 2015/0075482 A1* | 3/2015 | Kondo ................ | F16B 5/0664 123/198 E |

(Continued)

FOREIGN PATENT DOCUMENTS

JP        2004019548 A        1/2004

*Primary Examiner* — Tracie Y Green
(74) *Attorney, Agent, or Firm* — LeClairRyan

(57) ABSTRACT

An illuminated engine cover assembly including an engine attachment system and an illuminated engine cover is disclosed. The illuminated engine cover assembly comprises an attachment element attached to the engine and an illuminated engine cover composed of polymerized foam. The illuminated engine cover has a recessed area and a receptacle for releasable attachment to the engine attachment element. An illuminated feature is attached to the cover's recessed area. A contact element is fitted within the receptacle. A flexible printed circuit for providing contact between the illuminated feature and the contact element of the receptacle is embedded within the engine cover. A support lattice is optionally embedded within the cover. The support lattice has ends and an intermediate portion to which the illuminated feature is attached. Grommets are attached to each end of the support lattice. The releasable attachment receptacles are formed in the grommets.

20 Claims, 4 Drawing Sheets

(56) References Cited

U.S. PATENT DOCUMENTS

2018/0094669 A1* 4/2018 Muller ................ B60R 13/0838
2018/0340064 A1* 11/2018 Omoto ........................ C08J 9/12
2018/0358783 A1* 12/2018 Nola .................. H01R 12/7088

\* cited by examiner

ENGINE COVER HAVING EMBEDDED CIRCUIT FOR ILLUMINATED BADGING

TECHNICAL FIELD

The disclosed inventive concept relates generally to covers for vehicle engines. More particularly, the disclosed inventive concept relates to an engine cover composed of a foamed polymerized material such as polyurethane having external illuminated badging and flexible circuitry embedded within the cover. The circuitry connects the illuminated badging to a power source on the engine. The engine cover of the disclosed inventive concept may also include an internal support lattice to which at least a portion of the circuitry may be attached.

BACKGROUND OF THE INVENTION

The engine compartment of the modern vehicle has an appearance that is quite different from that of its predecessors. For decades following the introduction of the motor vehicle, the engine compartment was generally ignored by designers who, instead, focused on the exterior and interior of the vehicle. The engine compartment of the production vehicle (as opposed to the show vehicle) was solely functional.

Nowadays, however, both engineers and designers are engaged in efforts to improve the overall appearance of the engine compartment while looking at ways to improve noise reduction. The general result of these efforts is the inclusion in the engine compartment of an engine cover that covers at least some of the vehicle's engine. Known covers have a variety of shapes and styles and vary in the degree to which they cover the engine. The size and material of the engine cover both have an impact on the extent to which engine noise, vibration and harshness (NVH) can be controlled.

Show vehicle enthusiasts have taken the appearance of the engine compartment and the engine cover to another level. In some cases, the engine compartment is illuminated with lighting elements, such as LEDs, being arranged along the firewall, the side walls, and the radiator to highlight different features of the engine and adjacent components. Such illumination sometimes includes the engine cover itself which is fitted with lighting elements, again such as LEDs, to define a pattern or to illuminate a badge typically fitted to the top side of the engine cover.

To energize the illuminated engine cover and, in particular, the illuminated badge, wiring between the power source and the badge itself is necessary. Typically this wiring is in the form of exposed wires and, despite the creative efforts of the installer, the wires typically remain exposed and unattractive. While known arrangements for providing illuminated badging to the engine cover provide a certain degree of satisfaction to underhood appearance specialists, the challenge of hiding the wiring necessary to energize the illuminated badging still remains. Complicating the challenge is the need to contain the wiring substantially within the engine cover itself in order to avoid not only the unsightly appearance of exposed wiring but also to improve engine safety by minimizing the risk of engine compartment fire due to stray wiring. A further complication is the occasional need to remove the engine cover completely when undertaking certain service operations. Hard wired engine cover lighting serve only to interfere with the removal of the engine cover.

Accordingly, a common challenge for the custom car enthusiast is the need to combine functionality and serviceability with aesthetics in the engine cover having an illuminated badge. Consideration must therefore be given to ease of installation to maintain competitive assembly costs and ease of removability to maintain competitive repair costs. In addition to satisfying these requirements, the wiring necessary to illuminate the badge of the engine cover must also be simple, relatively light weight, inexpensive to produce, and integrated entirely within the cover itself.

As in so many areas of vehicle technology there is always room for improvement related to the design of engine covers having illuminated badging and to their methods of installation.

SUMMARY OF THE INVENTION

The disclosed inventive concept overcomes the problems associated with current approaches to providing power to illuminated badging provided on engine covers. The disclosed inventive concept provides an illuminated engine cover assembly that includes an attachment system on the engine for providing power to the cover and a cover composed of a polymerized foam material having flexible printed circuits overmolded therein. The embedded circuits provide current from the engine connection to the illuminated badging.

The illuminated engine cover assembly according to the disclosed inventive concept comprises an attachment element attached to the engine and an engine cover composed of a polymerized foam such as polyurethane. The engine cover has a recessed area and a receptacle for releasable attachment to the engine attachment element.

An illuminated feature is attached to the recessed area formed in the cover. A contact element such as a curved contact plate is fitted within the receptacle for electrical contact with the engine attachment element. A flexible printed circuit for providing contact between the illuminated feature and the contact element of the receptacle is embedded within the engine cover. The illuminated feature is preferably a light emitting diode (LED).

A preferred option is a support lattice also embedded within the cover. The support lattice, if provided, has a first end, a second end, and an intermediate portion. The illuminated feature is attached to the intermediate portion of the support lattice. A first grommet is attached to the first end of the support lattice and a second grommet is attached to the second end of the grommet. The receptacles for releasable attachment of the engine cover to the engine are formed in the grommets. Preferably, and if provided, the grommets include slots for receiving a portion of the flexible circuit.

The illuminated badging, as a part-in-assembly, and the flexible circuitry are preferably though not absolutely adhered to the lattice for a more simplified manufacturing process. Thereafter, the illuminated badge assembly, the flexible circuitry, and the associated lattice are placed within the cover mold and the polyurethane foam is cast around the components.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
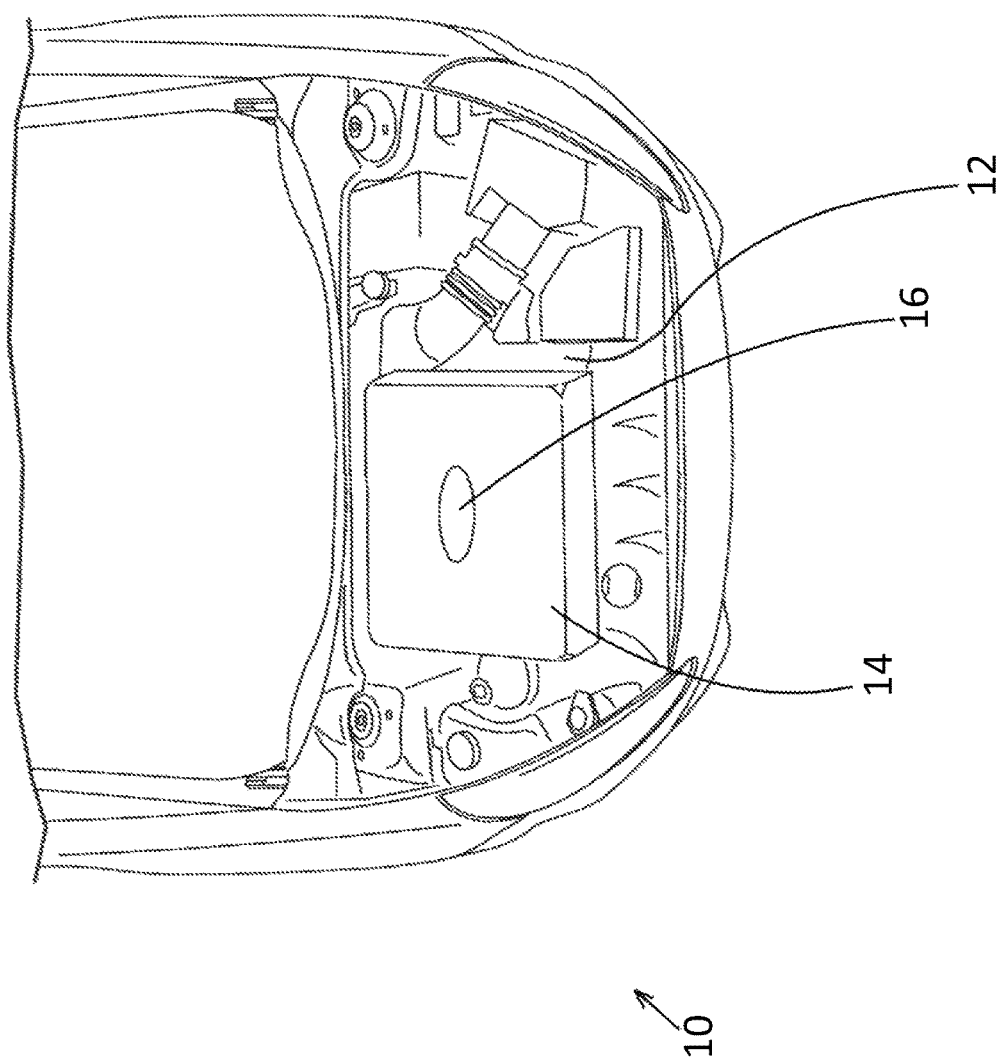
FIG. 1 is an environmental view of a vehicle engine cover having illuminated badging according to the disclosed inventive concept in place on an engine within a vehicle's engine compartment.

In the following figures, the same reference numerals will be used to refer to the same components. In the following description, various operating parameters and components are described for different constructed embodiments. These specific parameters and components are included as examples and are not meant to be limiting.

The accompanying figures and the associated description illustrate embodiments of the engine cover having illuminated badging according to the disclosed inventive concept. It is to be understood that the shape, size, and position of the engine cover and the illuminated badging as illustrated in the figures are suggestive and are not intended as being limiting. As a non-limiting example, the illustrated shape of the engine cover and illuminated badging is shown as being generally rectangular but may be adapted as needed for a certain space. As a further non-limiting example, the engine cover and the illuminated badging may have an irregular shape.

Figure 2:
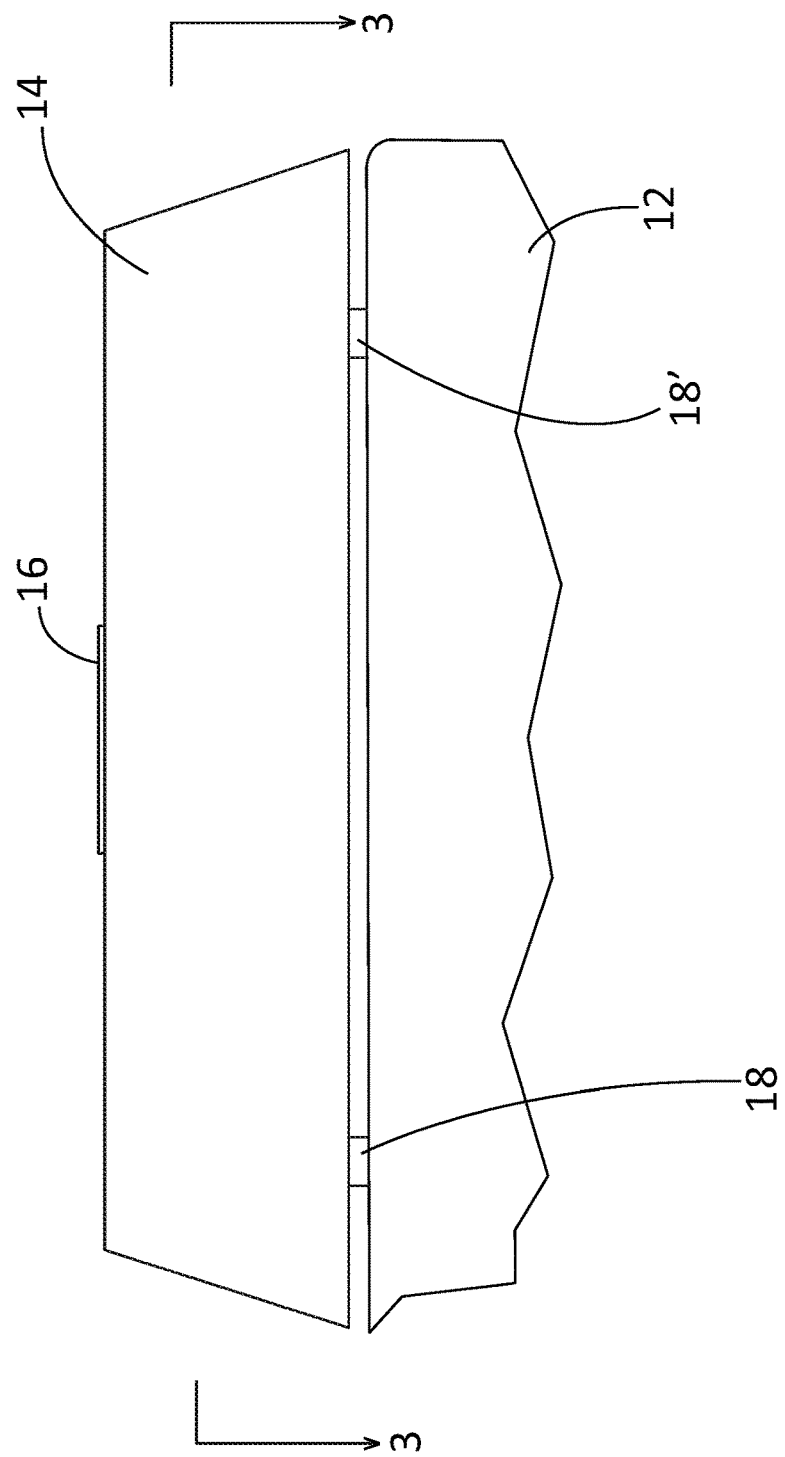
FIG. 2 is a side view of an embodiment of the vehicle engine cover having illuminated badging of FIG. 1.
Figure 3:
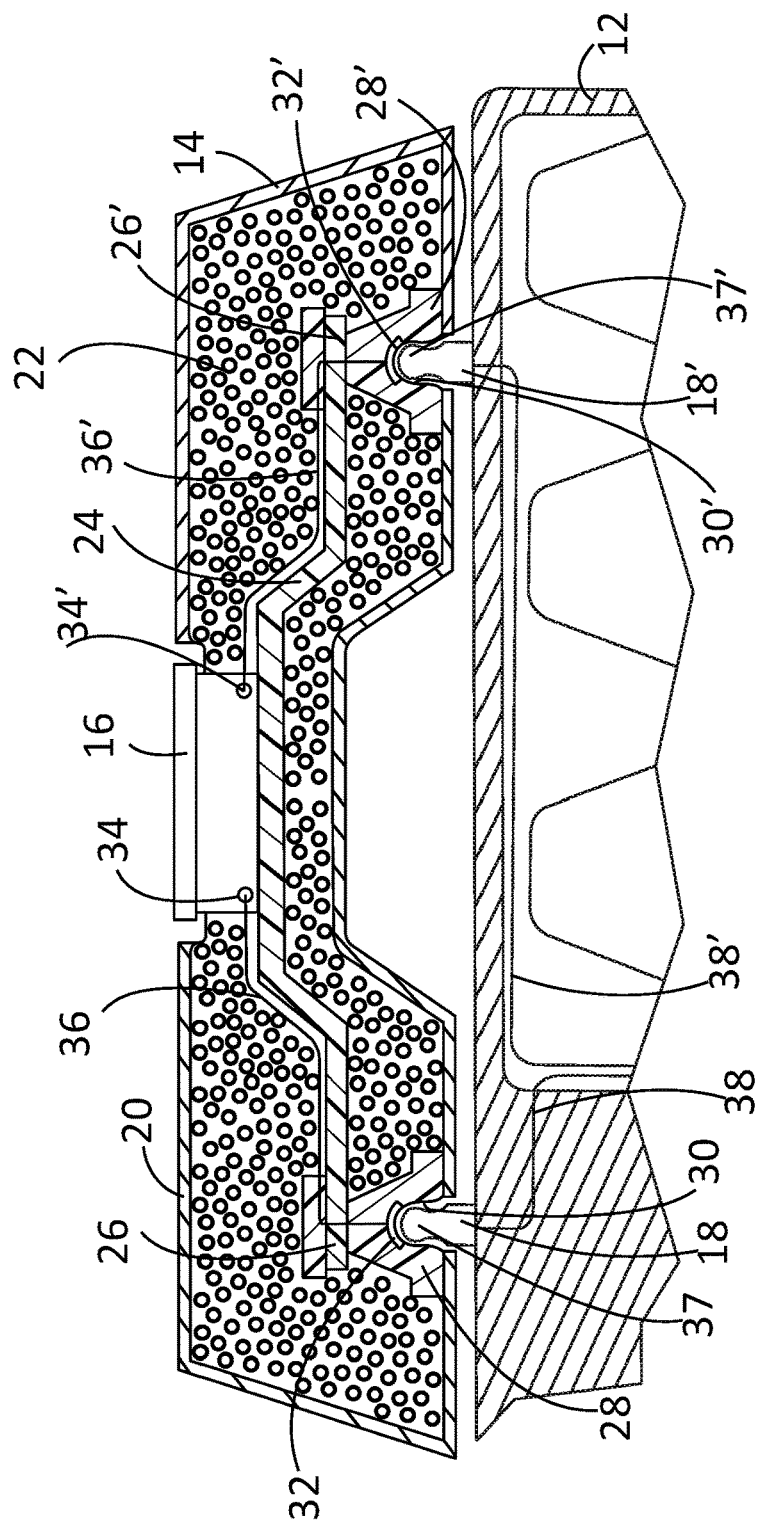
FIG. 3 is a sectional view of the vehicle engine cover having illuminated badging of FIG. 2 taken along line 3-3.
Figure 4:
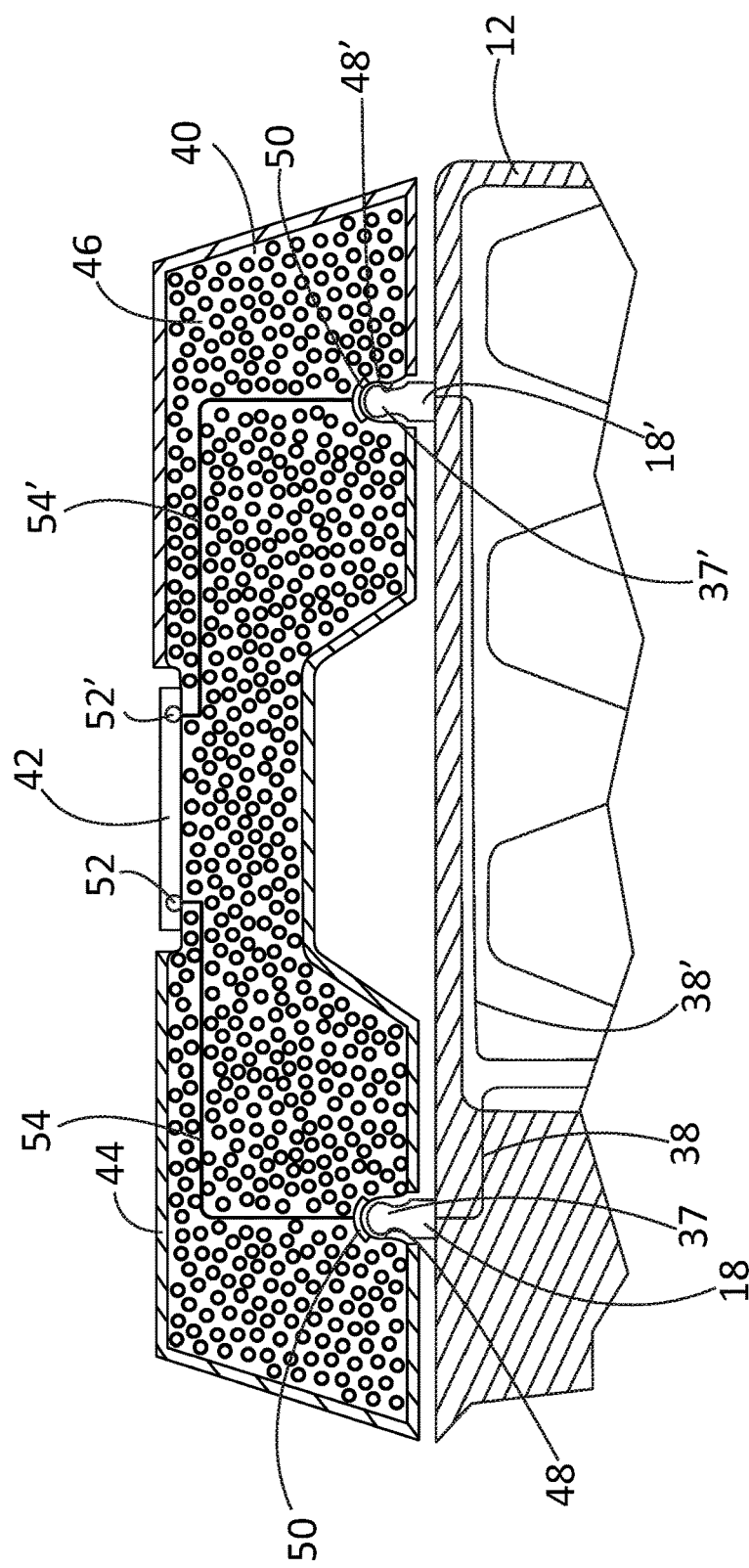
FIG. 4 is a sectional view of another embodiment the vehicle engine cover having illuminated badging according to the disclosed inventive concept.

FIGS. 1 through 4 illustrate two embodiments of the disclosed inventive concept for an illuminated engine cover. The two embodiments vary internally but not necessarily externally. Accordingly, FIG. 1, an environmental view of a portion of an engine compartment of a vehicle, illustrates the illuminated engine cover as it appears on an engine while FIG. 2 illustrates a side view of the engine cover. FIGS. 3 and 4 illustrate sectional views of two variations of the illuminated engine cover shown in FIGS. 1 and 2.

Referring to FIG. 1, the environmental view of a portion of the engine compartment of a vehicle, generally illustrated as 10, is shown. The shape and size of the engine compartment 10 is suggestive and is intended as being non-limiting. Positioned substantially within the engine compartment 10 is a vehicle engine 12. The engine 12 may be of any variety of engines and may be positioned either transversely or longitudinally relative to the long axis of the vehicle. The illustrated engine 12 is of the transverse type.

An illuminated engine cover 14 is removably attached to the top of the engine 12. The placement of the illuminated engine cover 14 may be other than the position shown and may, for example, cover more or less of the engine 12. The illuminated engine cover 14 includes at least one illuminated feature, such as an illuminated badge 16. As noted, the shapes and sizes of the illuminated engine cover 14 and the illuminated badge 16 as shown in the figures are only suggestive and alternative arrangements and configurations may be adopted without deviating from the underlying inventive concept as disclosed. In addition, while only a single illuminated badge 16 is illustrated, it is to be understood that more than one illuminated badge may be fitted.

The illuminated engine cover 14 is itself illustrated in isolation in FIGS. 2 through 4 in which both side and sectional views of the illuminated engine cover 14 are illustrated. The shape and size of the engine cover illustrated in FIGS. 2 through 4 are slightly different from the shape and size of the engine cover illustrated in FIG. 1 to illustrate the versatility of the disclosed inventive concept.

A side view of the illuminated engine cover 14 attached to the engine 12 is illustrated in FIG. 2. The illuminated engine cover 14 is attached to the engine 12 by an easily-released mechanical fastening arrangement such as by mechanical fasteners. Preferably, but not absolutely, two ball stud fasteners 18 and 18' are provided for attaching the illuminated engine cover 14 to the engine 12. The ball stud fastener arrangement is suggestive and is not intended as being limiting. The arrangement for attaching the illuminated removable illuminated engine cover 14 to the engine 12 by fastening is detailed in FIGS. 3 and 4.

Referring to FIG. 3, a sectional view of the illuminated removable vehicle engine cover 14 according to an embodiment of the disclosed inventive concept taken along line 3-3 of FIG. 2 is illustrated. The illuminated engine cover 14 may include an outer surface 20 that defines a layer formed during the molding process. The outer surface 20 may define a color or a mixture of colors and may also be a hard shell formed from a rigid polymerized material such as high-density polyethylene (HDPE).

The core of the illuminated engine cover 14 is defined by an inner body 22 that is preferably composed of a polymerized material such as polyurethane (PUR). Other polymerized, non-electrically conductive materials may be used in the alternative. The polyurethane is used to overmold the circuitry required to provide power to the illuminated badge 16.

It may be desired to have formed within the illuminated engine cover 14 an internal structure to provide increased durability and structural integrity. As illustrated in FIG. 3, a lattice structure 24 is provided within the inner body 22. The lattice structure 24 may also be made of a polymerized material such as nylon. The lattice structure 24 not only functions to provide the illuminated engine cover 14 with an interior structure that provides better integrity, but also functions as a mounting structure for other elements of the illuminated engine cover 14, such as the circuitry necessary to provide power to the illuminated badge 16 as well as providing support for the illuminated badge 16.

The lattice structure 24 has a first end 26 and a second end 26'. A first attachment grommet 28 is formed in the first end 26 while a second attachment grommet 28' is formed in the second end 26'. The first attachment grommet 28 includes a ball stud receiver pocket 30. The second attachment grommet 28' includes a ball stud receiver pocket 30'.

To provide electrical continuity between the engine 12, the ball stud fasteners 18 and 18' and the illuminated badge 16, a circuit is required. The circuit includes a pocket contact plate 32 positioned within the ball stud receiver pocket 30 and a pocket contact plate 32' positioned within the ball stud receiver pocket 30'. A flexible circuit line contact 34 and a flexible circuit line contact 34' are formed on the illuminated badge 16.

To complete the circuit within the illuminated engine cover 14, a flexible circuit line 36 is provided to connect the flexible circuit line contact 34 and the pocket contact plate 32 while a flexible circuit line 36' is provided to connect the flexible circuit line contact 34' and the pocket contact plate 32'. As illustrated in FIG. 3, a portion of the flexible circuit line 36 may pass through a groove or slot formed in the grommet 28 while a portion of the flexible circuit line 36' may pass through a groove or slot formed in the grommet 28'. In addition, the flexible circuit lines 36 and 36' may be mounted on the lattice structure 24.

Not only is the illuminated engine cover 14 releasably attached to the engine 12 by the ball studs 18 and 18', but these same structures provide power to the illuminated engine cover 14. Specifically, the ball stud fastener 18 has a ball tip 37 and a power line 38 that leads from the ball stud fastener 18 to a vehicle power source. In the same manner the ball stud fastener 18' has a ball tip 37' and a power line 38' that leads from the ball stud fastener 18' to the vehicle power source.

As noted above, it may not be necessary in certain applications to provide internal support in the form of a lattice in the illuminated engine cover of the disclosed inventive concept. One such embodiment is illustrated in FIG. 4 which is also a sectional view of the illuminated removable vehicle engine cover of FIG. 2 but according to a different construction.

With reference to FIG. 4, an illuminated engine cover 40 is illustrated in cross-section. The illuminated engine cover 40 includes an illuminated feature such as an illuminated badge 42. Given that the embodiment of the illuminated engine cover in FIG. 4 is provided without any internal structure, it may be desired to include with the illuminated engine cover 40 an outer surface 44 that provides a hard shell formed from a rigid polymerized material such as high-density polyethylene (HDPE) to thereby lend strength and durability to the illuminated engine cover 40. The outer surface 44 is formed during the molding process and may define a color or a mixture of colors.

The core of the illuminated engine cover 40 is defined by an inner body 46 that is preferably composed of a polymerized material such as polyurethane (PUR). Other polymerized, non-electrically conductive materials may be used in the alternative. The polyurethane is used to overmold the circuitry required to provide power to the illuminated badge 42.

A ball stud receiver pocket 48 is formed in the underside of the illuminated engine cover 40. A ball stud receiver pocket 48' is also formed in the underside of the illuminated engine cover 40. To provide electrical continuity between the engine 12 and the ball stud fasteners 18 and 18', and the illuminated badge 42, a circuit is required. The circuit includes a pocket contact plate 50 positioned within the ball stud receiver pocket 48 and a pocket contact plate 50' positioned within the ball stud receiver pocket 30'. A flexible circuit line contact 52 and a flexible circuit line contact 52' are formed on the illuminated badge 42.

To complete the circuit within the illuminated engine cover 14, a flexible circuit line 54 is provided to connect the flexible circuit line contact 52 and the pocket contact plate 50 while a flexible circuit line 54' is provided to connect the flexible circuit line contact 52' and the pocket contact plate 50'.

Consistent with the embodiment of the illuminated engine cover illustrated in FIG. 3 and as discussed in conjunction therewith, the ball studs 18 and 18' provide power to the illuminated engine cover 40. In the same manner as with the embodiment of the illuminated engine cover illustrated in FIG. 3, the ball tip 37 of the ball stud 18 is attached to the power line 38 that leads from the ball stud fastener 18 to a vehicle power source while the ball tip 37' of the ball stud 18' is attached to the power line 38' that leads from the ball stud fastener 18' to the vehicle power source.

The illuminated engine cover of the disclosed inventive concept is both aesthetically pleasing and functional and is valuable in providing a custom touch to the vehicle. Because the core of the illuminated engine cover is formed from a foamed polymerized material, the illuminated engine cover of the disclosed inventive concept is also functional in that it is an effective tool for reducing engine noise. The reduction of engine noise may be further improved by including an insulating material on the underside of the engine cover. The polyurethane core of the illuminated engine cover of the disclosed inventive concept is also very lightweight and can be easily removed and re-installed without tools due to the ball stud and receptacle arrangement. In use, the disclosed inventive concept provides a cost-effective and easy way of attaching an illuminated engine cover to the engine and to the vehicle's power source compared with known techniques.

Thus, the disclosed invention as set forth above overcomes the challenges faced by known illuminated engine cover assemblies. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A cover removably attachable to a vehicle engine having a cover attachment element, the cover comprising:
   an engine cover having a receptacle for releasable attachment to the cover attachment element, said cover being composed of a polymerized foam;
   an illuminated feature attached to said cover;
   a contact element associated with said receptacle; and
   a circuit embedded in said cover having an end connected with said illuminated feature and an end connected with said contact element.

2. The vehicle engine assembly of claim 1, further including a support lattice embedded within said cover, said lattice having a first end, a second end, and an intermediate portion, said illuminated feature being attached to said intermediate portion.

3. The vehicle engine assembly of claim 2, further including a grommet attached to said first end and a grommet attached to said second end, said receptacle for releasable attachment to said element being two receptacles, each of said grommets having one of said receptacles formed therein.

4. A vehicle engine assembly comprising:
   an engine having a cover attachment element;
   an engine cover having a receptacle for releasable attachment to said element, said cover being composed of a polymerized foam;
   an illuminated feature attached to said cover;
   a contact element associated with said receptacle; and
   a circuit embedded in said cover having an end connected with said illuminated feature and an end connected with said contact element.

5. The vehicle engine assembly of claim 4, further including a support lattice embedded within said cover.

6. The vehicle engine assembly of claim 5, wherein said lattice has a first end, a second end, and an intermediate portion, said illuminated feature being attached to said intermediate portion.

7. The vehicle engine assembly of claim 6, further including a grommet attached to said first end and a grommet attached to said second end, said receptacle for releasable attachment to said element being two receptacles, each of said grommets having one of said receptacles formed therein.

8. The vehicle engine assembly of claim 7, each of said grommets further including a slot formed therein for receiving a portion of said circuit.

9. The vehicle engine assembly of claim 4, wherein said cover attachment element is a ball stud.

10. The vehicle engine assembly of claim 4, wherein said polymerized foam is a polyurethane.

11. The vehicle engine assembly of claim 4, wherein said illuminated feature includes at least one light emitting diode.

12. The vehicle engine assembly of claim 4, wherein said circuit is a flexible printed circuit.

13. A vehicle engine assembly comprising:
an engine having an attachment element;
an engine cover having a receptacle for releasable attachment to said element, said cover being composed of a polymerized foam;
a support lattice embedded within said cover;
an illuminated feature attached to said cover;
a contact element associated with said receptacle; and
a circuit embedded in said cover having an end connected with said illuminated feature and an end connected with said contact element.

14. The vehicle engine assembly of claim 13, wherein said lattice has a first end, a second end, and an intermediate portion, said illuminated feature being attached to said intermediate portion.

15. The vehicle engine assembly of claim 14, further including a grommet attached to said first end and a grommet attached to said second end, said receptacle for releasable attachment to said element being two receptacles, each of said grommets having one of said receptacles formed therein.

16. The vehicle engine assembly of claim 15, each of said grommets further including a slot formed therein for receiving a portion of said circuit.

17. The vehicle engine assembly of claim 13, wherein said cover attachment element is a ball stud.

18. The vehicle engine assembly of claim 13, wherein said polymerized foam is a polyurethane.

19. The vehicle engine assembly of claim 13, wherein said illuminated feature includes at least one light emitting diode.

20. The vehicle engine assembly of claim 13, wherein said circuit is a flexible printed circuit.

* * * * *